(12) United States Patent
Mishima et al.

(10) Patent No.: US 7,817,526 B2
(45) Date of Patent: Oct. 19, 2010

(54) OPTICAL RECORDING MEDIUM

(75) Inventors: Koji Mishima, Tokyo (JP); Takashi Kikukawa, Tokyo (JP); Hidetake Itoh, Tokyo (JP)

(73) Assignee: TDK Corporation, Tokyo (JP)

( * ) Notice: Subject to any disclaimer, the term of this patent is extended or adjusted under 35 U.S.C. 154(b) by 532 days.

(21) Appl. No.: 11/892,088

(22) Filed: Aug. 20, 2007

(65) Prior Publication Data

US 2008/0049595 A1 Feb. 28, 2008

(30) Foreign Application Priority Data

Aug. 24, 2006 (JP) .............................. 2006-227793
Aug. 2, 2007 (JP) .............................. 2007-201884

(51) Int. Cl.
*G11B 7/24* (2006.01)
*B32B 3/02* (2006.01)

(52) U.S. Cl. ................. 369/275.1; 369/275.2; 428/64.1

(58) Field of Classification Search .............. 369/275.1, 369/275.5, 283; 428/64.1, 64.4; 430/321, 430/320, 270.1, 270.11, 270.13

See application file for complete search history.

(56) References Cited

U.S. PATENT DOCUMENTS

2004/0191683 A1* 9/2004 Nishihara et al. ...... 430/270.11
2006/0222810 A1* 10/2006 Hayashi et al. ............ 428/64.4

FOREIGN PATENT DOCUMENTS

JP A 2004-213720 7/2004

OTHER PUBLICATIONS

Kitaura, Hideki et al., "Multi-Layer Write-Once Media With Te-O-Pd Films Utilizing a Violet Laser," Optical Data Storage 2001, Proceedings of SPIE, vol. 4342, pp. 340-347, Apr. 2001.
Mishima, Koji et al., "150 GB, 6-Layer Write Once Disc for Blu-Ray Disc System," Optical Data Storage 2006, Proceedings of SPIE, vol. 6282, pp. 628201-01-628201-11, Apr. 2006.

* cited by examiner

*Primary Examiner*—Joseph H Feild
*Assistant Examiner*—Nicholas Lee
(74) *Attorney, Agent, or Firm*—Oliff & Berridge, PLC

(57) ABSTRACT

An optical recording medium has a five-layer structure including five recording layers, namely an $L_0$ layer, an $L_1$ layer, an $L_2$ layer, an $L_3$ layer, and an $L_4$ layer in this order from a side farthest away from a laser light incident surface. The materials of the respective recording layers are selected so that the rate of change in transmittance Tb/Ta as taken from the laser light incident surface satisfies $0.93 < Tb/Ta < 1.07$ when recording on the $L_0$ layer among the recording layers, where: Ta is transmittance of laser light to reach the $L_0$ layer when the $L_0$ layer is irradiated with the laser light of optimum recording power after recording marks are formed on all the recording layers closer to the laser light incident surface (being the $L_1$ to $L_4$ layers); and Tb is transmittance of laser light to reach the $L_0$ layer when the $L_0$ layer is irradiated with the laser light of optimum recording power with no recording mark formed on any of the recording layers closer to the laser light incident surface.

6 Claims, 2 Drawing Sheets

OPTICAL RECORDING MEDIUM

BACKGROUND OF THE INVENTION

1. Field of the Invention

The present invention relates to an optical recording medium having a plurality of recording layers.

2. Description of the Related Art

Optical recording media such as compact discs (CDs) and digital versatile discs (DVDs) are widely utilized as information recording media. In recent years, attention has also been given to optical recording media that utilize blue or blue violet laser light as the irradiation light so that a larger amount of information can be recorded than that available using convention laser light systems.

Optical recording media are generally classified into the following types: a ROM (Read Only Memory) type in which data cannot be recorded or rewritten, an RW (Rewritable) type in which data can be rewritten, and an R (Recordable) type in which data can be recorded only once.

In the RW and R type optical recording media, data is recorded by irradiating a recording layer with laser light to form recording marks that have a reflectivity different from that of surrounding space areas. Data is reproduced from a typical optical recording medium by irradiating a recording layer with laser light and detecting the difference in reflectivity between the recording marks and the space areas with a photodetector.

Such optical recording media can be provided with a plurality of recording layers, therefore resulting in higher recording capacities.

In the case of a multilayer optical recording medium having a plurality of recording layers, irradiation light must be transmitted, at least in part, through all the recording layer(s) other than the one farthest away from the light incident surface. The inventors have prototyped multilayer optical recording media having n layers (where n is 3 or 5) and found the following. When recording information on the recording layer (the $L_0$ layer) farthest away from the light incident surface, for example, the light that is transmitted through the $L_{n-1}$ to $L_1$ layers to reach the $L_0$ layer undergoes a change in amount far greater than conventionally expected, depending on whether or not recording marks are already formed on the recording layers that the laser light is to be transmitted through, i.e. those that lie closer to the light incident surface (being the $L_1$ to $L_{n-1}$ layers).

It is easily conceivable that the greater the number of layers, the greater the change in transmittance that will occur between when recording and when not recording, in proportion to the number of recording layers required to transmit light. If the number of recording layers increases from two to three, or to five for example, the number of recording layers necessary to transmit light also increases from one to two, or to four. The inventors have found that the rate of change in transmittance before and after recording may increase to as much as two or four fold. This has revealed the problem that the recording conditions of the respective recording layers vary to a degree that is greater than expected, depending on the presence or absence of recording marks on the $L_1$ to $L_{n-1}$ layers, and that satisfactory recording cannot be necessarily undertaken, even if under identical recording conditions.

It has also been found that this propensity may even become more pronounced, i.e., the rate of change in transmittance to the $L_0$ layer varies significantly in recording media having three or more layers, particularly when the $L_1$ layer is already recorded.

SUMMARY OF THE INVENTION

In view of the foregoing problems, various exemplary embodiments of this invention provide a multilayer optical recording medium which is capable of recording information satisfactorily on recording layers other than the one lying closest to its light incident surface, even under the same recording power condition irrespective of whether or not recording layers for the laser light to be transmitted through, lying closer to the light incident surface, are already recorded on.

The inventors have made intensive studies and found the following. Consider that a multilayer optical recording medium includes at least three recording layers, namely an $L_0$ layer, an $L_1$ layer, and an $L_2$ layer in that order from the side farthest away from a laser light incident surface. The materials of the recording layers shall be selected so that the cumulative rates of change in transmittance from the laser light incident surface to the respective recording layers fall within the range of 0.93 to 1.07. This then makes it possible to suppress variations in the recording sensitivities of the respective recording layers before and after recording, and allows satisfactory recording, even under the same recording power condition.

In summary, the above-described objectives are achieved by the following embodiments of the present invention.

(1) An optical recording medium comprising at least three recording layers including an $L_0$ layer, an $L_1$ layer, and an $L_2$ layer arranged in this order from a side farthest away from a laser light incident surface, the recording layers being irradiated with laser light to form recording marks different in a reflection from that of surrounding space areas, wherein the recording layers are made of respective materials that satisfy $0.93<Tb/Ta<1.07$, where Ta is transmittance of light to reach the $L_0$ layer when recording marks are formed on all the recording layers excluding the $L_0$ layer, and Tb is transmittance of light to reach the $L_0$ layer when no recording mark is formed on any of the recording layers excluding the $L_0$ layer, Tb/Ta being a rate of change in light transmittance as taken from the laser light incident surface.

(2) An optical recording medium comprising at least three recording layers including an $L_0$ layer, an $L_1$ layer, and an $L_2$ layer arranged in this order from a side farthest away from a laser light incident surface, the recording layers being irradiated with laser light to form recording marks different in a reflection from that of surrounding space areas, wherein the recording layers are made of respective materials that satisfy $0.93<Pwa/Pwb<1.07$, where Pwa is optimum recording power for recording on the $L_0$ layer when recording marks are formed on all the recording layers excluding the $L_0$ layer, and Pwb is optimum recording power for recording on the $L_0$ layer when no recording mark is formed on any of the recording layers excluding the $L_0$ layer, Pwa/Pwb being a rate of change in optimum recording power as taken from the laser light incident surface.

(3) The optical recording medium according to (1) or (2), wherein a recording film of at least the $L_1$ layer among the recording layers excluding the recording layer closest to the laser light incident surface is made of a material different from that of a recording film of the closest recording layer.

(4) The optical recording medium according to (3), wherein the recording film of the recording layer closest to the laser light incident surface has an extinction coefficient of 0.5 or smaller.

According to the present invention, a multilayer optical recording medium having recording layers, namely an $L_0$ layer, an $L_1$ layer, . . . , an $L_{n-1}$ layer is configured so that the rate of change in transmittance to reach the $L_0$ layer, depending on whether or not the $L_1$ layer to the $L_{n-1}$ layer are recorded on, falls within 7% in cumulative value. It is therefore possible to obtain sufficiently favorable recording signals even with the same recording power irrespective of whether or not the $L_1$ layer to the $L_{n-1}$ layer are recorded.

DETAILED DESCRIPTION OF THE PREFERRED EMBODIMENTS

Figure 1:
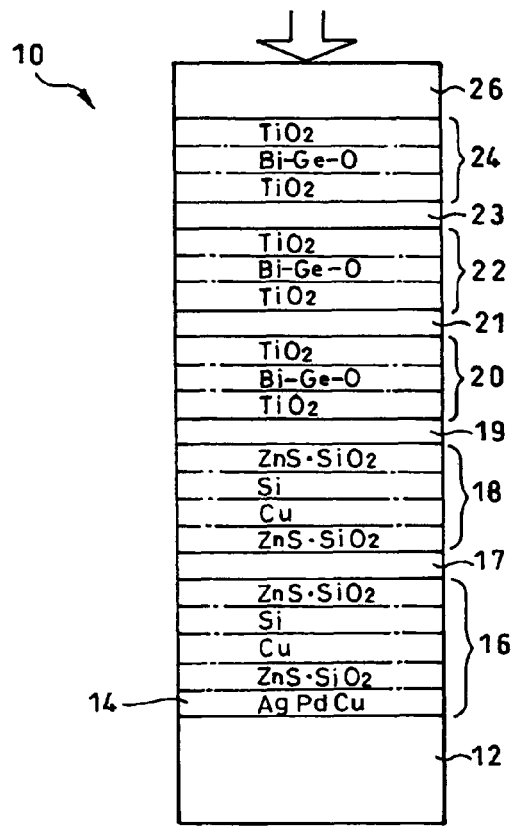
FIG. 1 is a sectional view schematically showing an optical recording medium according to a first exemplary embodiment of the present invention.

Hereinafter, exemplary embodiments of the present invention will be described in detail with reference to the drawings.

An optical recording medium 10 according to the first exemplary embodiment has a five-layer structure in which recording layers, namely an $L_0$ layer 16, an $L_1$ layer 18, an $L_2$ layer 20, an $L_3$ layer 22, and an $L_4$ layer 24 are formed on a substrate 12 in this order. The $L_0$ layer 16 includes a reflective film 14.

Spacer layers 17, 19, 21, and 23 are interposed between the foregoing $L_0$ layer 16 to the $L_4$ layer 24, respectively. The laser light incident surface of the optical recording medium 10 is made of a light transmitting layer 26.

The substrate 12 is made of polycarbonate and has a thickness of 1.1 mm, with transferred grooves (not shown) included in the surface. The $L_0$ layer 16 includes the reflective film 14 formed on the substrate 12 side. This reflective film 14 is made of a 100-nm-thick AgPdCu alloy (98:1:1 in mol %).

As shown in FIG. 1, the $L_0$ layer 16 is composed of the reflective film 14, and a 40-nm-thick $ZnS \cdot SiO_2$ layer (dielectric, 80:20 in mol %)/a 6-nm-thick Cu layer, a 6-nm-thick Si layer (recording film)/a 40-nm-thick $ZnS \cdot SiO_2$ layer (dielectric, 80:20 in mol %) which are laminated thereon.

The $L_1$ layer 18 is also made of the same $ZnS \cdot SiO_2$ (80:20 in mol %)/Cu/Si/$ZnS \cdot SiO_2$ (80:20 in mol %) layer arrangement, being the same as those of the $L_0$ layer 16 excluding the reflective film 14, with thicknesses of 110 nm, 5 nm, 4 nm, and 27 nm, respectively.

The $L_2$ layer 20 to the $L_4$ layer 24 are each made of a $TiO_2$ (dielectric)/Bi—Ge—O (recording film)/$TiO_2$ (dielectric) layer arrangement.

Table 1 shows the thicknesses of the $TiO_2$/Bi—Ge—O/$TiO_2$ layers and the composition of Bi—Ge—O (recording film) in the $L_2$ layer 20 to the $L_4$ layer 24.

TABLE 1

| | | Thickness | | Composition | | |
|---|---|---|---|---|---|---|
| | | nm | μm | (mol %) | | |
| | Light transmitting layer | | 40 | | | |
| $L_4$ | $TiO_2$ | 15 | | Bi | Ge | O |
| | Bi—Ge—O | 43 | | 20 | 13 | 67 |
| | $TiO_2$ | 15 | | | | |
| | Spacer layer | | 15 | | | |
| $L_3$ | $TiO_2$ | 15 | | Bi | Ge | O |
| | Bi—Ge—O | 40 | | 22 | 11 | 67 |
| | $TiO_2$ | 15 | | | | |
| | Spacer layer | | 13 | | | |
| $L_2$ | $TiO_2$ | 14 | | Bi | Ge | O |
| | Bi—Ge—O | 38 | | 22 | 10 | 68 |
| | $TiO_2$ | 14 | | | | |
| | Spacer layer | | 21 | | | |
| $L_1$ | $ZnS \cdot SiO_2$ | 27 | | | | |
| | Si | 4 | | | | |
| | Cu | 5 | | | | |
| | $ZnS \cdot SiO_2$ | 110 | | | | |
| | Spacer layer | | 15 | | | |
| $L_0$ | $ZnS \cdot SiO_2$ | 40 | | | | |
| | Si | 6 | | | | |
| | Cu | 6 | | | | |
| | $ZnS \cdot SiO_2$ | 40 | | | | |
| | APC | 100 | | | | |
| | Substrate | | 11000 | | | |

The spacer layers 17, 19, 21, and 23 may be made of transparent energy-ray curing resins such as an ultraviolet curing acrylic resin or an ultraviolet curing epoxy resin, with thicknesses of 15 μm, 21 μm, 13 μm, and 15 μm, respectively.

Like the spacer layers, the light transmitting layer 26 may also be made of transparent energy-ray curing resins such as an ultraviolet curing acrylic or an epoxy resin.

It should be appreciated that the substrate 12 has a concavo-convex pattern of grooves included thereon, and the $L_0$ layer 16 to the $L_4$ layer 24 formed thereon also have the same concavo-convex pattern as that of the substrate 12.

In order to measure each individual recording layer of the optical recording medium 10 for reflectivity in an unlaminated state, the recording layers were deposited on individual polycarbonate substrates. A light transmitting layer with a thickness of 100 μm was applied thereto in order to fabricate optical recording media. These optical recording media were evaluated for reflectivity R' in an optical disc evaluator (ODU-1000, from Pulstec Industrial Co., Ltd., wavelength=405 nm, NA=0.85). Table 2 shows the reflectivities R' before lamination in the rightmost column.

TABLE 2

| Recording film | | All recording layers closer to incident surface are unrecorded Pwb (mW) | All recording layers closer to incident surface are recorded Pwa (mW) | Cumulative rate of change in transmittance Tb/Ta | Rate of change in transmittance of recording layer one closer to incident surface than recording layer in question Tb'/Ta' | Reflectivity before lamination R' (%) |
|---|---|---|---|---|---|---|
| Bi—Ge—O | $L_4$ | 10 | 10 | 1.00 | 1.00 | 2.8 |
| Bi—Ge—O | $L_3$ | 10.5 | 10.5 | 1.00 | 1.00 | 3.6 |
| Bi—Ge—O | $L_2$ | 10.4 | 10.2 | 0.98 | 0.98 | 4.5 |

TABLE 2-continued

| Recording film | | All recording layers closer to incident surface are unrecorded Pwb (mW) | All recording layers closer to incident surface are recorded Pwa (mW) | Cumulative rate of change in transmittance Tb/Ta | Rate of change in transmittance of recording layer one closer to incident surface than recording layer in question Tb'/Ta' | Reflectivity before lamination R' (%) |
|---|---|---|---|---|---|---|
| Si/Cu | $L_1$ | 10.2 | 9.7 | 0.95 | 0.97 | 6.2 |
| Si/Cu | $L_0$ | 10.5 | 10.1 | 0.96 | 1.01 | 19.0 |

Moreover, the recording film of the $L_4$ layer 24 was deposited on a grooveless substrate and an extinction coefficient was measured using ETA-RT (from STEAG ETA-Optik). The Bi—Ge—O recording film of the $L_4$ layer 24 showed an extinction coefficient of 0.08.

In the above-described optical recording medium 10 according to the first exemplary embodiment, consider the instance where all the recording layers lying closer to the laser light incident surface than a target recording layer (being the recording layer to record/reproduce) does are recorded in advance. The optimum recording power for recording information on the target recording layer with minimum jitter during reproduction shall be referred to as Pwa. The ratio of the amount of light that is transmitted from the laser light incident surface to immediately prior to the target recording layer shall be referred to as Ta (when recording with the recording power of Pwa, the amount of light transmitted to reach the target recording layer is Pwa×Ta). Consider also the case where all the recording layers closer to the laser light incident surface than the target recording layer are unrecorded. In this case, the optimum recording power for recording information on that recording layer with minimum jitter during reproduction shall be referred to as Pwb. The ratio of the amount of light that is transmitted from the laser light incident surface to immediately prior to the target recording layer shall be referred to as Tb (when recording with the recording power of Pwb, the amount of light transmitted to reach the target recording layer is Pwb×Tb).

It therefore follows that Tb/Ta shows the cumulative change in transmittance between when information is recorded on all the recording layers that are closer to the incident surface than target the recording layer and when nothing is recorded at all. Furthermore, assuming that a recording layer one closer to the laser light incident surface than the target recording layer is recorded in advance, the amount of light to be transmitted through that recording layer shall be Ta'. Assuming also that the recording layer one closer to the laser light incident surface than the target recording layer is unrecorded, the amount of light to be transmitted through that recording layer shall be Tb'. Tb'/Ta' then shows a change in transmittance at only the target recording layer, when information is recorded only on the recording layer one closer to the incident surface than the target recording layer between when nothing is recorded at all on the recording layer that are closer to the incident surface than the target recording layer.

The foregoing Table 2 shows Pwa, Pwb, Tb/Ta, Tb'/Ta', and R' for each recording layer. In this instance, Pwa and Pwb were determined using the optical disc evaluator (ODU-1000). Recording strategies were optimized for the respective recording layers. Recording signals used were random signals having three-valued recording power, with a base power of 0.5 mW.

When determining Pwa and Pwb, the optimum recording powers were measured using the same recording strategy along with a constant ratio of intermediate recording power/recording power. In this instance, recording and reproduction were performed with a linear velocity of 4.9 m/s.

Now, the difference between the optimum recording powers Pwa and Pwb is ascribable to a difference between the amounts of light reaching the recording layer. Assuming that Pw is the optimum recording power when the light transmittance to the recording layer in question is 100%, Tb/Ta can be determined as follows:

$Pw=Pwa*Ta, Pw=Pwb*Tb$, and thus $Tb/Ta=Pwa/Pwb$.

When determining Ta is $Ta_0$, Tb is $Tb_0$, Pwa is $Pwa_0$, Pwb is $Pwb_0$ on the $L_0$ layer, $Tb_0/Ta_0$ can be shown as $Tb_0/Ta_0=Pwa/Pwb$. Similar to the above, the ratio, $Tb_1/Ta_1$ can be shown as $Tb_1/Ta_1=Pwa_1/Pwb_1$. $Ta_2$ to $Ta_4$ and $Tb_2$ to $Tb_4$ in a five layers optical recording medium can be shown similar to the above. However, $Ta_4$, $Tb_4$, $Ta_4'$ and $Tb_4'$ are 1.00 (=rate of transmittance is 100%) because there is no layers that closer to the incident surface than the $L_4$ layer.

Further, as $Ta_0$ and $Tb_0$ are the ratio of the amount of light incident surface to immediately prior to the $L_0$ layer, these are given by the following equations in the five layers optical recording medium. In the following equation, Ta' on the $L_0, \ldots, L_4$ layer are shown as $Ta_0' \ldots, Ta_4'$ and Tb' on the $L_0, \ldots L_4$ layer are also shown as $Tb_0' \ldots Tb_4'$.

$Ta_0=Ta_0'*Ta_1'* \ldots *Ta_4'$, and $Tb_0=Tb_0'*Tb_1'* \ldots *Tb_4'$.

$Tb_1$ and $Ta_1$ are similarly given by $Ta_1=Ta_1'*Ta_2'* \ldots *Ta_4'$ $Tb_1=Tb_1'*Tb_2'* \ldots *Tb_4'$ $Tb_2$ to $Tb_4$ and $Ta_2$ to $Ta_4$ can also be expressed likewise. These equations yield:

$Tb_0'/Ta_0'=(Tb_0/Ta_0)/(Tb_1/Ta_1)$.

As $Tb_0/Ta_0$ and $Tb_1/Tb_1$ are shown $Pwa_0/Pwb_0$ and $Pwa_1/Pwb_1$, Tb'/Ta' can be determined from each optimum recording power of the layers.

For the recording layers other than the $L_0$ layer, Tb'/Ta' can also be determined in the same manner. Since Tb/Ta=Pwa/Pwb can be utilized for calculations as detailed above, it is possible to easily determine the rates of change in transmittance of the respective recording layers by measuring the optical recording powers.

The rates of change in transmittance of the recording layers are determined according to the above. The rate of change in transmittance of the $L_0$ layer is not large when information is already recorded on all the recording layers $L_2 \sim L_4$, but large when information is already recorded on all the recording layers $L_1 \sim L_4$. Pwa, Pwb, Tb/Ta, Tb'/Ta' are shown in Table 2.

As the $L_4$ layer is closest to the laser light incident surface and the laser light is irradiated not through other layers than the $L_4$ layer, Pwa is equivalent to Pwb and Tb/Ta, Tb'/Ta' of $L_4$ are shown as "1.00"

for each recording layer. The extinction coefficient of the Bi—Ge—O recording film of the $L_2$ layer was determined by the same method as in the first exemplary embodiment, and found to be 0.13.

TABLE 4

| Recording film | | All recording layers closer to incident surface are unrecorded Pwb (mW) | All recording layers closer to incident surface are recorded Pwa (mW) | Cumulative rate of change in transmittance Tb/Ta | Rate of change in transmittance of recording layer one closer to incident surface than recording layer in question Tb'/Ta' | Reflectivity before lamination R' (%) |
|---|---|---|---|---|---|---|
| Bi—Ge—O | $L_2$ | 8.3 | 8.3 | 1.00 | 1.00 | 4.5 |
| Si/Cu | $L_1$ | 9.3 | 9.1 | 0.98 | 0.98 | 6.2 |
| Si/Cu | $L_0$ | 9.2 | 9 | 0.98 | 1.00 | 19.0 |

In the optical recording medium 10 according to this first exemplary embodiment, the cumulative rate of change in transmittance was suppressed to 0.95 (5%) in the $L_1$ layer 18 and 0.96 (4%) in the $L_0$ layer 16.

Multilayer optical recording media, such as double-layer DVD, typically allow rates of change in transmittance of no higher than 7% and preferably no higher than 5%.

In the optical recording medium according to the first exemplary embodiment, the maximum cumulative rate of change in transmittance Tb/Ta is 0.96 (4%), with which even a five-layer optical recording medium can be recorded with little deterioration of jitter.

Figure 2:
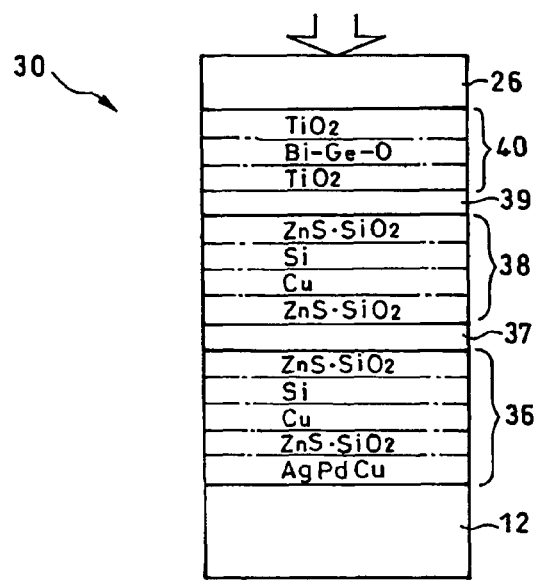
FIG. 2 is a sectional view schematically showing an optical recording medium according to a second exemplary embodiment of the same.

As shown in FIG. 2, an optical recording medium 30 according to the second exemplary embodiment includes an $L_0$ layer 36, an $L_1$ layer 38, and an $L_2$ layer 40 formed on a substrate 12, with respective spacer layers 37 and 39 therebetween. Table 3 shows the components and thicknesses of the individual layers and the composition of the recording films.

TABLE 3

| | Thickness | | Composition | | |
|---|---|---|---|---|---|
| | nm | μm | (mol %) | | |
| Light transmitting Layer | | 64 | | | |
| $TiO_2$ | 14 | | Bi | Ge | O |
| Bi—Ge—O | 38 | | 22 | 10 | 68 |
| $TiO_2$ | 14 | | | | |
| Spacer Layer | | 21 | | | |
| ZnS•$SiO_2$ | 27 | | | | |
| Si | 4 | | | | |
| Cu | 5 | | | | |
| ZnS•$SiO_2$ | 110 | | | | |
| Spacer layer | | 15 | | | |
| ZnS•$SiO_2$ | 40 | | | | |
| Si | 6 | | | | |
| Cu | 6 | | | | |
| ZnS•$SiO_2$ | 40 | | | | |
| AgPdCu | 100 | | | | |
| Substrate | | 11000 | | | |

In order to measure each individual recording layer of the optical recording medium 30 according to the second exemplary embodiment for reflectivity in an unlaminated state, the recording layers were deposited on individual polycarbonate substrates. A light transmitting layer with a thickness of 100 μm was applied thereto in order to fabricate optical recording media. These optical recording media were evaluated for reflectivity R' in an optical disc evaluator. Table 4 shows the reflectivities before lamination in the rightmost column. Like Table 2, Table 4 also shows Pwa, Pwb, Tb/Ta, Tb'/Ta', and R'

In this second exemplary embodiment, the $L_0$ layer 36 and the $L_1$ layer 38 have the maximum cumulative rates of change in transmittance of 0.98, while the allowable rates of change in transmittance are no higher than 7% or no higher than 5%.

Comparative Example 1

For a comparative example, an optical recording medium was fabricated with the same five recording layers as those of the optical recording medium 10 according to the first exemplary embodiment. This comparative example 1 differs from the optical recording medium 10 of the first exemplary embodiment only in the configuration of the $L_1$ layer. The $L_2$ layer to the $L_4$ layer were configured the same. Table 5 shows the thicknesses of the respective layers and the composition of the recording films in the optical recording medium of this comparative example 1.

TABLE 5

| | Thickness | | Composition | | |
|---|---|---|---|---|---|
| | nm | μm | (mol %) | | |
| Light transmitting layer | | 40 | | | |
| $TiO_2$ | 15 | | Bi | Ge | O |
| Bi—Ge—O | 43 | | 22 | 11 | 67 |
| $TiO_2$ | 15 | | | | |
| Spacer layer | | 15 | | | |
| $TiO_2$ | 15 | | Bi | Ge | O |
| Bi—Ge—O | 40 | | 22 | 10 | 68 |
| $TiO_2$ | 15 | | | | |
| Spacer layer | | 13 | | | |
| $TiO_2$ | 14 | | Bi | Ge | O |
| Bi—Ge—O | 38 | | 25 | 7 | 68 |
| $TiO_2$ | 14 | | | | |
| Spacer layer | | 21 | | | |
| $TiO_2$ | 10 | | Bi | Ge | O |
| Bi—Ge—O | 34 | | 28 | 2 | 70 |
| $TiO_2$ | 10 | | | | |
| Spacer layer | | 15 | | | |
| ZnS•$SiO_2$ | 40 | | | | |
| Si | 6 | | | | |
| Cu | 6 | | | | |
| ZnS•$SiO_2$ | 40 | | | | |
| AgPdCu | 100 | | | | |
| Substrate | | 11000 | | | |

Like Table 2, Table 6 shows Pwa, Pwb, Tb/Ta, Tb'/Ta', and R' for each recording layer of the optical recording medium according to this comparative example 1.

TABLE 6

| Recording film | | All recording layers closer to incident surface are unrecorded Pwb (mW) | All recording layers closer to incident surface are recorded Pwa (mW) | Cumulative rate of change in transmittance Tb/Ta | Rate of change in transmittance of recording layer one closer to incident surface than recording layer in question Tb'/Ta' | Reflectivity before lamination R' (%) |
|---|---|---|---|---|---|---|
| Bi—Ge—O | $L_4$ | 9.0 | 9.0 | 1.00 | 1.00 | 3.0 |
| Bi—Ge—O | $L_3$ | 9.5 | 9.4 | 0.99 | 0.99 | 3.8 |
| Bi—Ge—O | $L_2$ | 9.1 | 8.8 | 0.97 | 0.98 | 4.8 |
| Bi—Ge—O | $L_1$ | 8.9 | 8.4 | 0.94 | 0.98 | 6.9 |
| Si/Cu | $L_0$ | 9.8 | 8.8 | 0.90 | 0.95 | 19.0 |

According to this comparative example, the cumulative rate of change in transmittance to the $L_0$ layer is 0.9 (i.e., the recording sensitivity changes by 10%). It can thus be seen that if information is already recorded on all the recording layers $L_1$ to $L_4$ lying closer to the incident surface than the $L_0$ layer does, it is impossible to perform satisfactory recording on the $L_0$ layer using recording power that is optimum when information is not recorded on any of the recording layers $L_1$ to $L_4$. With a recording power of 10.2 mW, which is optimum when information is not recorded on any of the recording layers $L_1$ to $L_4$ lying closer to the incident surface than the $L_0$ layer does, recording resulted in jitters of 6% if information was not recorded on any of the recording layers. Conversely, if information was recorded on all the recording layers $L_1$ to $L_4$, recording with a recording power of 10.2 mW showed jitter of 8.5%. Blu-ray discs require jitter of no higher than 6.5%, and it is shown that jitters of 8.5% result in failure to provide sufficient signals.

Comparative Example 2

As shown in Table 7, an optical recording medium according to comparative example 2 has a three-layer structure, including an $L_0$ layer, an $L_1$ layer, and an $L_2$ layer. This optical recording medium has basically the same configuration as that of the optical recording medium 30 according to the second exemplary embodiment shown in FIG. 2. The difference from the second exemplary embodiment lies in the configuration of the $L_1$ layer, whereas the $L_2$ layer has almost the same configuration as that of the second exemplary embodiment.

TABLE 7

| | Thickness | | Composition | | |
|---|---|---|---|---|---|
| | nm | μm | (mol %) | | |
| Light transmitting layer | | 64 | | | |
| $TiO_2$ | 14 | | | | |
| Bi—Ge—O | 38 | | Bi 25 | Ge 7 | O 68 |
| $TiO_2$ | 14 | | | | |
| Spacer layer | | 21 | | | |
| $TiO_2$ | 10 | | | | |
| Bi—Ge—O | 34 | | Bi 28 | Ge 2 | O 70 |
| $TiO_2$ | 10 | | | | |
| Spacer layer | | 15 | | | |
| ZnS•$SiO_2$ | 40 | | | | |
| Si | 6 | | | | |
| Cu | 6 | | | | |
| ZnS•$SiO_2$ | 40 | | | | |
| AgPdCu | 100 | | | | |
| Substrate | | 11000 | | | |

Like Table 4, Table 8 shows Pwa, Pwb, Tb/Ta, Tb'/Ta', and R' for each layer of the optical recording medium according to this comparative example 2. The extinction coefficient of the Bi—Ge—O recording film of the $L_2$ layer was determined using the same method as detailed in the first exemplary embodiment, and was found to be 0.13.

TABLE 8

| Recording film | | All recording layers closer to incident surface are unrecorded Pwb (mW) | All recording layers closer to incident surface are recorded Pwa (mW) | Cumulative rate of change in transmittance Tb/Ta | Rate of change in transmittance of recording layer one closer to incident surface than recording layer in question Tb'/Ta' | Reflectivity before lamination R' (%) |
|---|---|---|---|---|---|---|
| Bi—Ge—O | $L_2$ | 7.3 | 7.3 | 1.00 | 1.00 | 4.5 |
| Bi—Ge—O | $L_1$ | 7.7 | 7.5 | 0.97 | 0.97 | 6.2 |
| Si/Cu | $L_0$ | 8.3 | 7.7 | 0.93 | 0.95 | 19.0 |

From Table 8, it can be seen that the cumulative rate of change in transmittance to the $L_0$ layer is 0.93. If information is already recorded on both the recording layers $L_1$ and $L_2$ lying closer to the incident surface than the $L_0$ layer does, it is impossible to perform satisfactory recording on the $L_0$ layer using recording power that is optimum when information is not recorded on either of the recording layers $L_1$ and $L_2$.

Comparative Example 3

Figure 3:
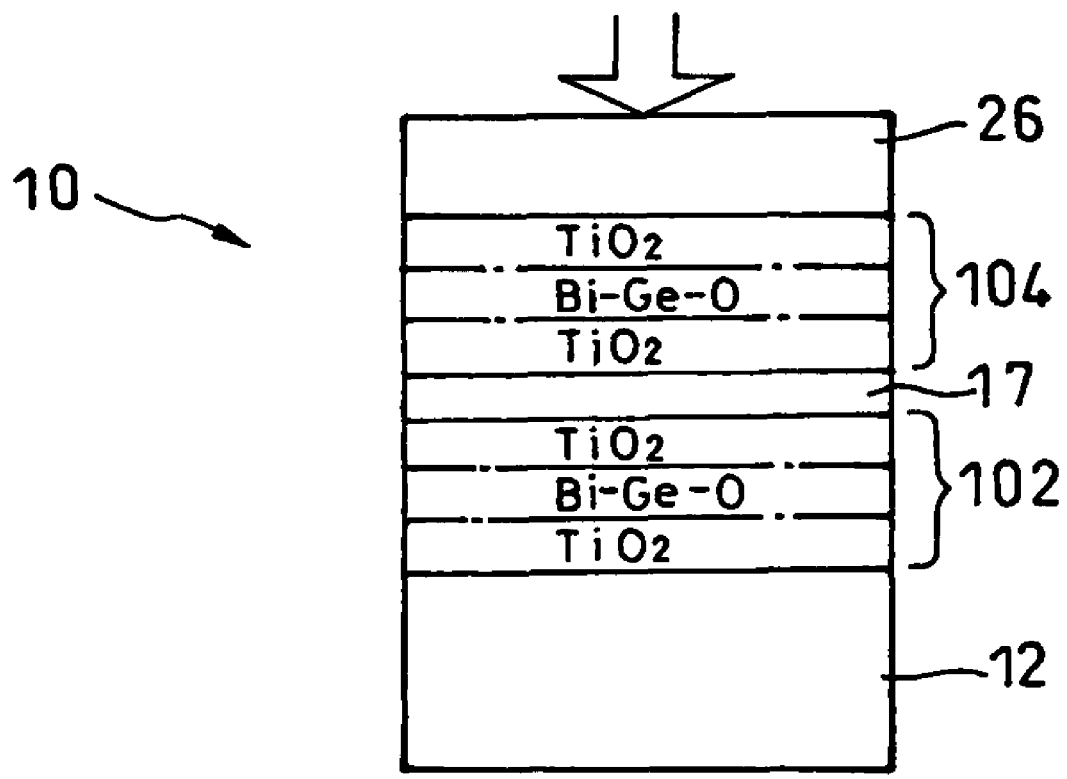
FIG. 3 is a sectional view schematically showing an optical recording medium according to comparative example 3.

An optical recording medium 100 according to comparative example 3 will now be described with reference to FIG. 3.

This optical recording medium 100 includes two recording layers, namely an $L_0$ layer 102 and an $L_1$ layer 104 which have the same configuration as those of the $L_3$ layer and the $L_4$ layer of the multilayer optical recording medium 10 according to the first exemplary embodiment. The other components will be designated with the same reference numerals as used in the first exemplary embodiment, and description thereof will be omitted where appropriate.

Table 9 shows the thicknesses of the respective layers and the composition of the recording films in the optical recording medium 100 of this comparative example 3. Table 10 shows Pwa, Pwb, Tb/Ta, and Tb'/Ta' for each recording layer of the optical recording medium 100 according to this comparative example 3.

TABLE 9

|  | Thickness | | Composition | | |
|---|---|---|---|---|---|
|  | nm | μm | (mol %) | | |
| Light transmitting layer |  | 85 |  |  |  |
| $TiO_2$ | 15 |  | Bi | Ge | O |
| Bi—Ge—O | 43 |  | 22 | 11 | 67 |
| $TiO_2$ | 15 |  |  |  |  |
| Spacer layer |  | 15 |  |  |  |
| $TiO_2$ | 15 |  | Bi | Ge | O |
| Bi—Ge—O | 40 |  | 22 | 10 | 68 |
| $TiO_2$ | 15 |  |  |  |  |
| Substrate |  | 11000 |  |  |  |

TABLE 10

| Recording layer | | Pwb (mW) | Pwa (mW) | Tb/Ta | Tb'/Ta' |
|---|---|---|---|---|---|
| Bi—Ge—O | $L_1$ | 9 | 9 | 1.00 | 1.00 |
| Bi—Ge—O | $L_0$ | 9.5 | 9.4 | 0.99 | 0.99 |

From Table 10, it can be seen that the cumulative rate of change in transmittance to the $L_0$ layer 102 is extremely small.

The inventors have determined the reason why multilayer optical recording media having three or more layer produce the problem where the cumulative rate of change in transmittance can exceed its allowable value as mentioned above. The reason is as follows.

For recording layers, the state where there is zero rate of change in transmittance before and after recording is equivalent to a situation where "the difference in reflectivity before and after recording"="the difference in the amount of light absorption before and after recording."

Multilayer optical recording media are preferably designed so that their recording layers provide approximately the same reflectivities after lamination. In terms of reflectivity under the configuration of a substrate/a recording layer/a light transmitting layer alone as shown in Table 2, recording layers lying farther away from the light incident surface must therefore have higher values. Recording marks require a modulation factor (the amount of change in reflectivity of a marked area on a recording layer/the reflectivity of a space area) of 50% or greater than that of unrecorded areas. Thus, recording layers lying closer to the substrate (being ones lying farther away from the light incident surface) need to produce greater differences in reflectivity before and after recording.

When an identical recording film material is used to provide a plurality of light-transmitting recording films, it is possible to adjust their reflectivities by modifying the type of materials and thicknesses of the dielectrics. The changes in the amount of absorption after recording, however, are highly dependent on the recording film material.

For example, when using Bi—Ge—O recording films as shown in comparative example 1, the $L_4$ layer and the $L_3$ layer having reflectivities of approximately 2% to 4% produce extremely small differences in transmittance before and after recording. The $L_2$ layer and the $L_1$ layer which have reflectivities of above 4%, however, show extremely high transmittances after recording. Furthermore, the Si/Cu-type recording layers used for the $L_1$ layers of the first and second exemplary embodiments have Tb'/Ta' of 1.01 or 1.00. If the dielectrics of these recording layers facing toward the laser light incident surface are adjusted in thickness so that the reflectivities are designed to be 2%, then Tb'/Ta' is 1.04. The inventors have found that the differences in transmittance after recording are thus greater than those of the $L_4$ and $L_3$ layers in the first exemplary embodiment which are made of Bi—Ge—O type recording films.

That is, the reason for the foregoing small differences in transmittance before and after recording is because the changes in reflectivity occurring before and after recording are balanced with changes in absorption after recording. If there is a plurality of recording layers having different transmittances as is the case in a multilayered medium with three or more layers, the recording layers require different respective reflectivities. The resulting differences in reflectivity thus vary from one recording layer to another. To preclude the recording layers from causing differences in transmittance before and after recording, the recording layers must therefore have respective variations of difference in absorption. Since the changes in absorption of the recording layers are dependent on the respective recording film materials, it is impossible to adjust the differences in absorption of the recording layers after recording in conformity to respective totally different reflectivities, as in multilayer optical recording media having three or more layers. This is why the differences in transmittance before and after recording matter significantly to optical recording media having three or more recording layers, even if little to ones having two recording layers.

After many trials and errors, the inventors have found that the cumulative rates of change in transmittance of from 0.93 to 1.07, as found in the first and second exemplary embodiments, can be easily achieved using a material that is different from that used for the recording film of the recording layer closest to the laser light incident surface (the $L_4$ layer in the first exemplary embodiment, the $L_2$ layer in the second exemplary embodiment) for the recording film of at least the $L_1$ layer of the other recording layers that are not closest to the laser light incident surface.

This is because the recording film material used for the $L_1$ layers in the first and second exemplary embodiments shows a minimum difference in transmittance before and after recording if it has a reflectivity of approximately 6% when in the configuration of a substrate, the recording layer, and a light transmitting layer in this order. In particular, since the reflectivity of the $L_1$ layer before lamination is significantly different from that of the recording layer closest to the laser light incident surface, it is highly effective to make the recording film material of the $L_1$ layer different from that of the recording layer closest to the laser light incident surface. In this instance, if the recording film of the $L_4$ layer in the first exemplary embodiment or the $L_2$ layer in the second exemplary embodiment has an extinction coefficient of 0.5 or less, the reflectivity decreases by only a small amount because of the high transmittance. This shows that the desirable reflectivities of the respective layers thus become lower, allowing for easy lamination of a number of layers.

The foregoing first exemplary embodiment has dealt with the case where the optical recording medium 10 is a five-layer recording medium in which the five recording layers 16, 18, 20, 22, and 24 and the spacer layers 17, 19, 21, and 23 are formed alternately. Nevertheless, the present invention provides the same effects even with four-layer optical recording media and multilayer optical recording media having six or more layers.

In the foregoing first and second exemplary embodiments, the optical recording media 10 and 30 are of a single-sided recording type, being capable of recording information on one side alone. It should be understood, however, that the present invention is also applicable to an optical recording medium of a double-sided recording type, having recording layers on both sides.

In the foregoing first and second exemplary embodiments, the optical recording media 10 and 30 are also configured so that the light transmitting layer 26 is thinner than the substrate 12. It is understood, however, that the present invention is also applicable to an optical recording medium having a substrate and a light transmitting layer of an equal thickness, as in the case with DVDs.

Furthermore, while the foregoing first and second exemplary embodiments have dealt with the case of evaluating the optical recording media 10 and 30 using a Blu-ray™ disc system of NA=0.85 and wavelength=405 nm, the present invention is also applicable to different wavelengths and different NAs.

What is claimed is:

1. An optical recording medium comprising at least three recording layers including an $L_0$ layer, an $L_1$ layer, and an $L_2$ layer arranged in this order from a side farthest away from a laser light incident surface, the recording layers being irradiated with laser light to form recording marks different in a reflection from that of surrounding space areas, wherein the recording layers are made of respective materials that satisfy 0.93<Tb/Ta<1.07, where Ta is transmittance of light to reach the $L_0$ layer when recording marks are formed on all the recording layers excluding the $L_0$ layer, and Tb is transmittance of light to reach the $L_0$ layer when no recording mark is formed on any of the recording layers excluding the $L_0$ layer, Tb/Ta being a rate of change in light transmittance as taken from the laser light incident surface.

2. The optical recording medium according to claim 1, wherein a recording film of at least the $L_1$ layer among the recording layers excluding the recording layer closest to the laser light incident surface is made of a material different from that of a recording film of the closest recording layer.

3. An optical recording medium comprising at least three recording layers including an $L_0$ layer, an $L_1$ layer, and an $L_2$ layer arranged in this order from a side farthest away from a laser light incident surface, the recording layers being irradiated with laser light to form recording marks different in a reflection from that of surrounding space areas, wherein the recording layers are made of respective materials that satisfy 0.93<Pwa/Pwb<1.07, where Pwa is optimum recording power for recording on the $L_0$ layer when recording marks are formed on all the recording layers excluding the $L_0$ layer, and Pwb is optimum recording power for recording on the $L_0$ layer when no recording mark is formed on any of the recording layers excluding the $L_0$ layer, Pwa/Pwb being a rate of change in optimum recording power as taken from the laser light incident surface.

4. The optical recording medium according to claim 3, wherein a recording film of at least the $L_1$ layer among the recording layers excluding the recording layer closest to the laser light incident surface is made of a material different from that of a recording film of the closest recording layer.

5. The optical recording medium according to claim 2, wherein the recording film of the recording layer closest to the laser light incident surface has an extinction coefficient of 0.5 or smaller.

6. The optical recording medium according to claim 3, wherein the recording film of the recording layer closest to the laser light incident surface has an extinction coefficient of 0.5 or smaller.

* * * * *